W. H. & H. T. COLDWELL.
LAWN MOWER.
APPLICATION FILED MAR. 15, 1912.
1,085,585.
Patented Jan. 27, 1914.
9 SHEETS—SHEET 1.
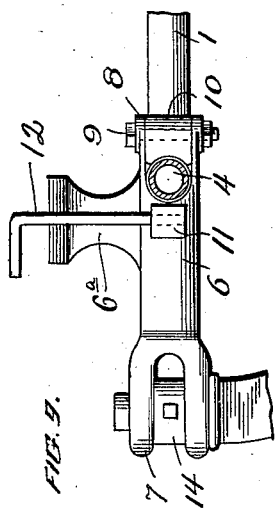
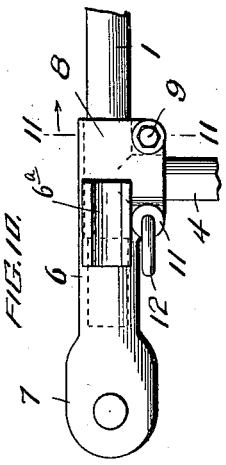
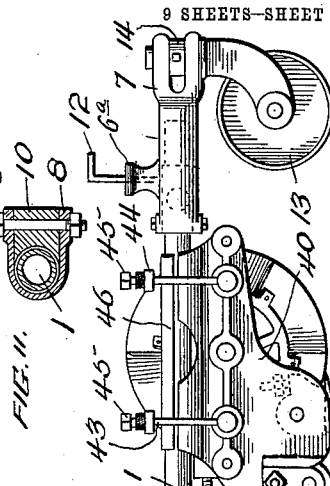
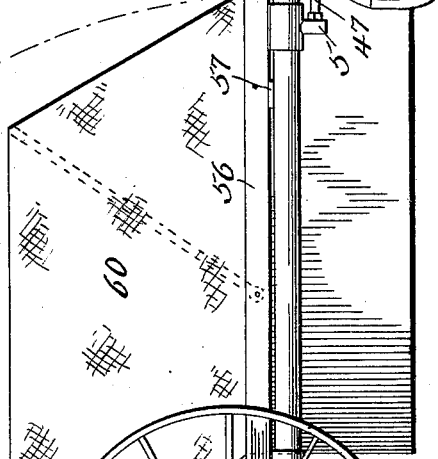
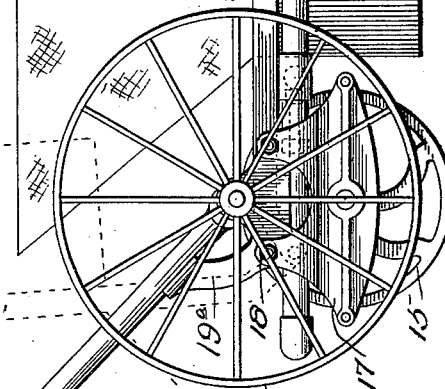
WITNESSES:
INVENTORS
William H. Coldwell
and
Harry T. Coldwell
By Whitaker & Prevost
Attorneys

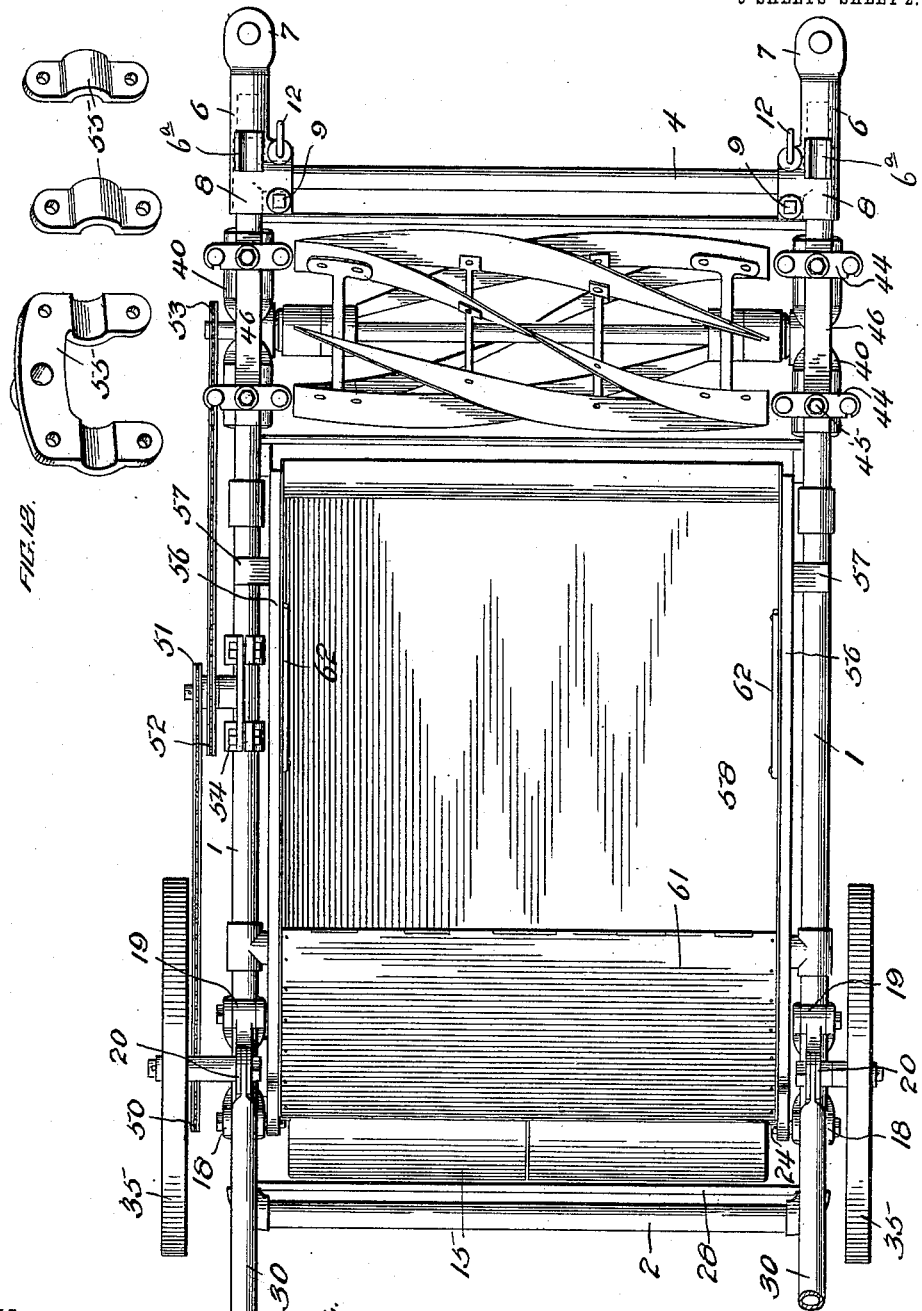

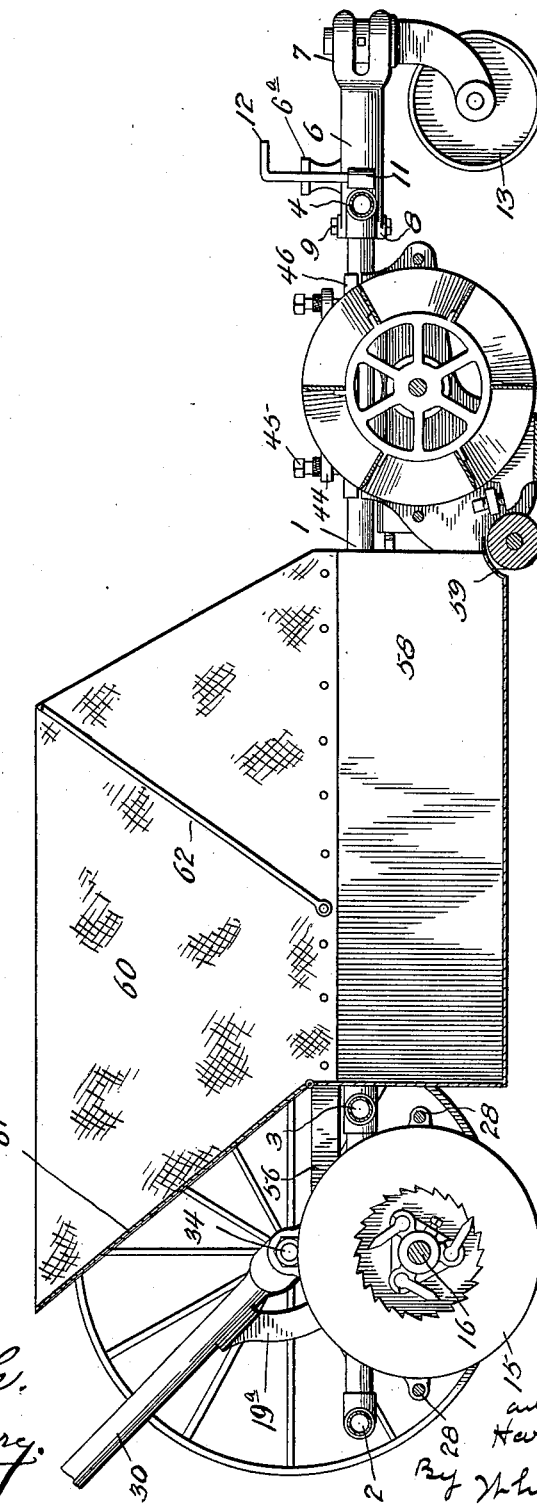

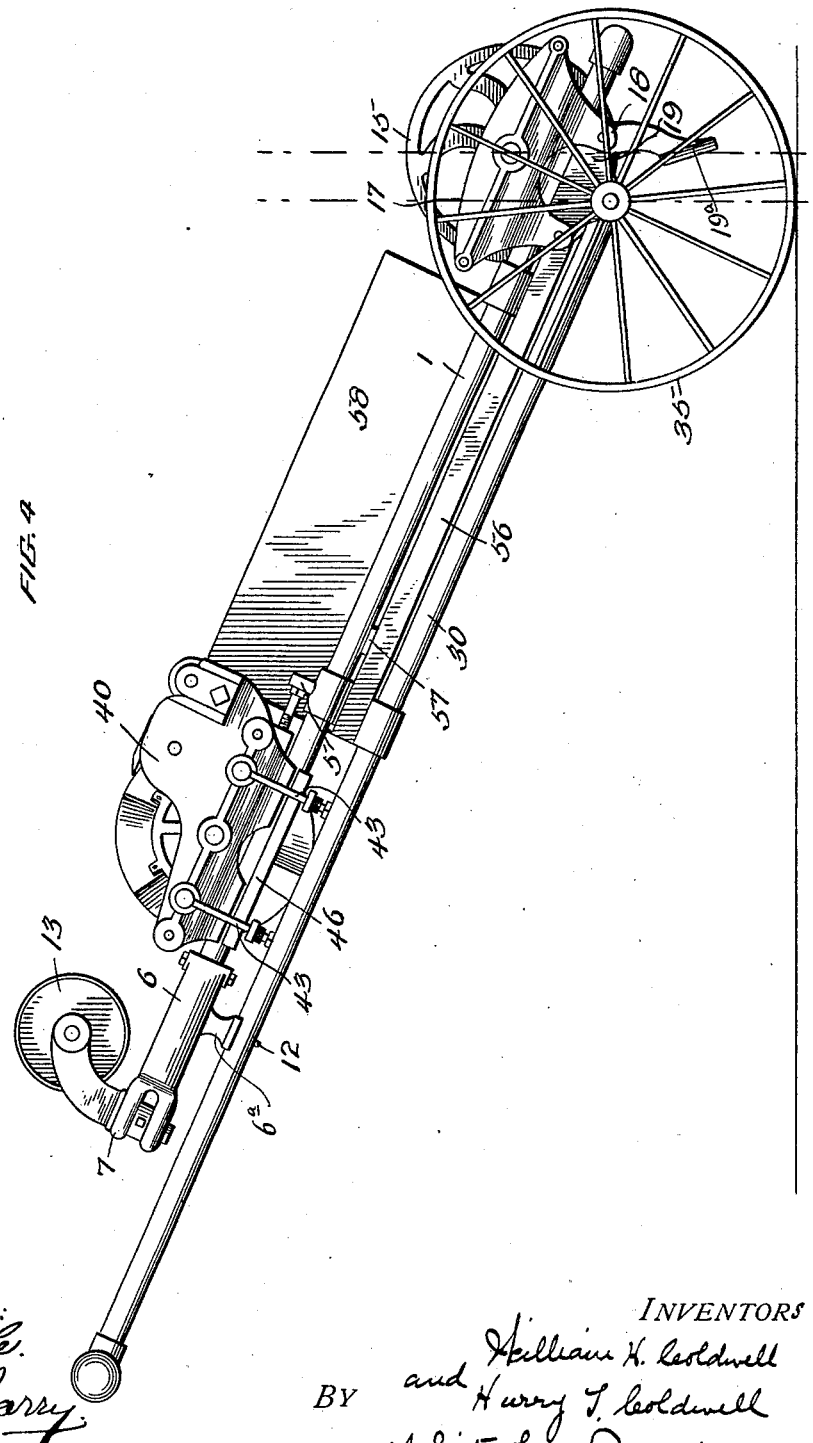

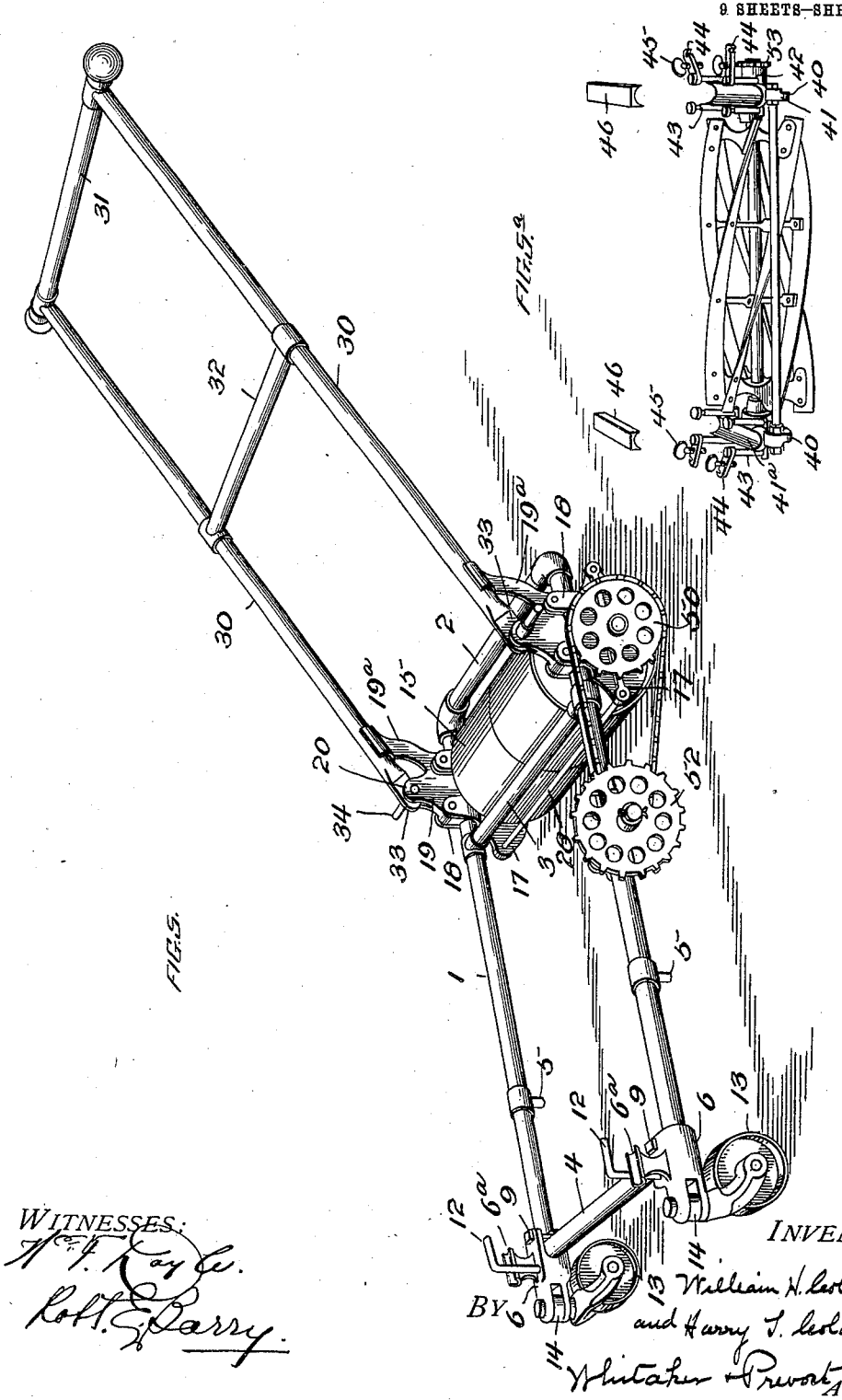

W. H. & H. T. COLDWELL.
LAWN MOWER.
APPLICATION FILED MAR. 15, 1912.
1,085,585.
Patented Jan. 27, 1914.
9 SHEETS—SHEET 6.
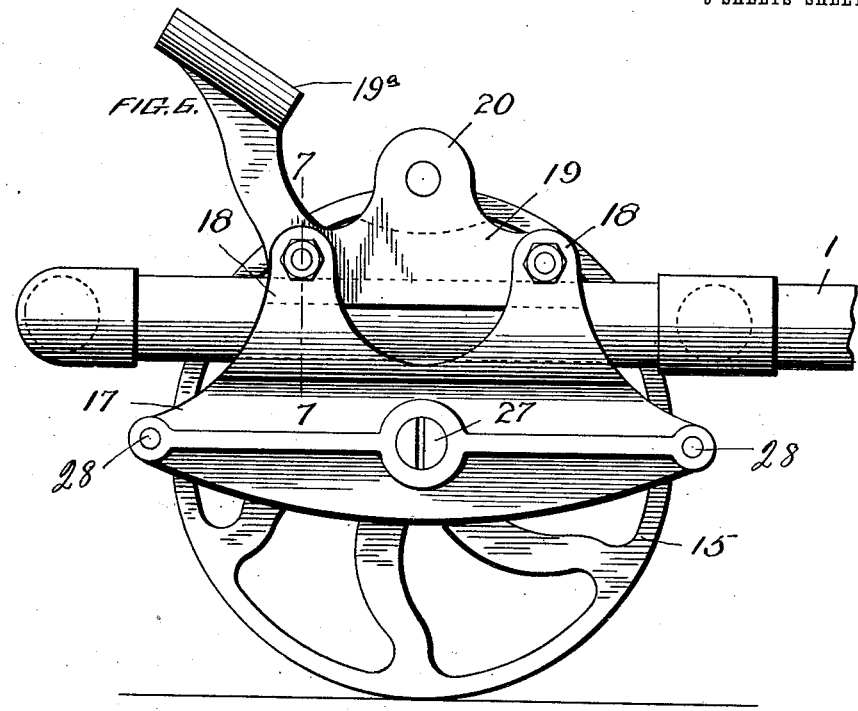
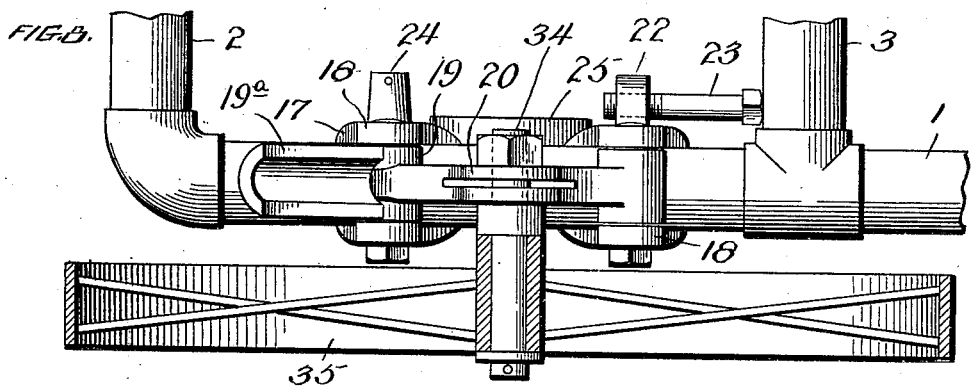
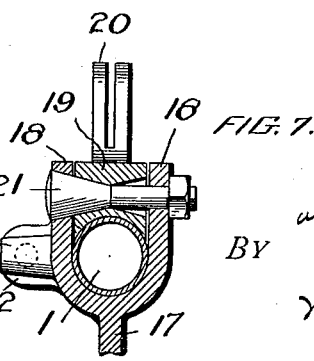
WITNESSES:
W. F. Kayle.
Robt Barry.
INVENTORS
William H. Coldwell
and Harry T. Coldwell
BY Whitaker & Prevost
Attorneys

W. H. & H. T. COLDWELL.
LAWN MOWER.
APPLICATION FILED MAR. 15, 1912.

1,085,585.

Patented Jan. 27, 1914.

9 SHEETS—SHEET 7.

WITNESSES:

INVENTORS
William H. Coldwell
and
Harry T. Coldwell
By
Whitaker Prevost
Attorneys

W. H. & H. T. COLDWELL.
LAWN MOWER.
APPLICATION FILED MAR. 15, 1912.

1,085,585.

Patented Jan. 27, 1914.
9 SHEETS—SHEET 8.

WITNESSES:

INVENTORS
William H. Coldwell
Harry T. Coldwell
BY Whitaker Prevost
Attorneys

W. H. & H. T. COLDWELL.
LAWN MOWER.
APPLICATION FILED MAR. 15, 1912.
1,085,585.
Patented Jan. 27, 1914.
9 SHEETS—SHEET 9.
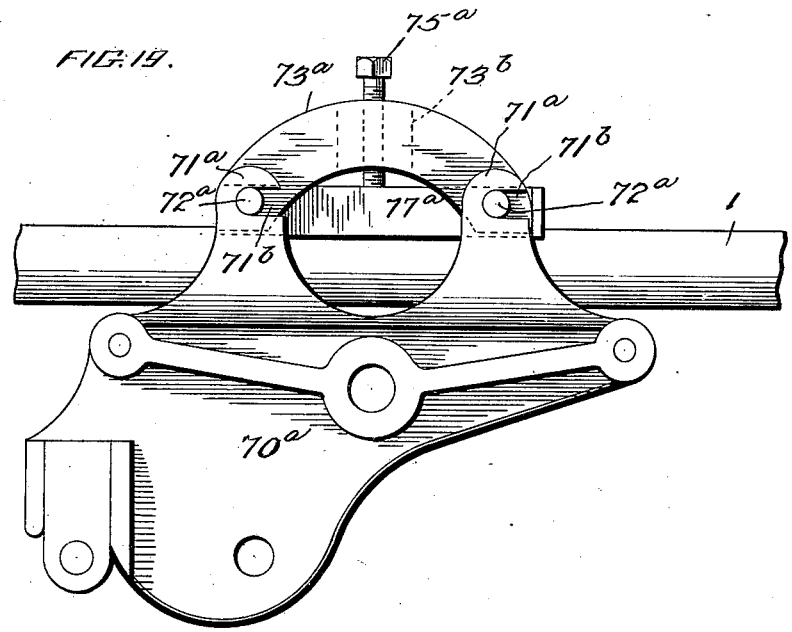
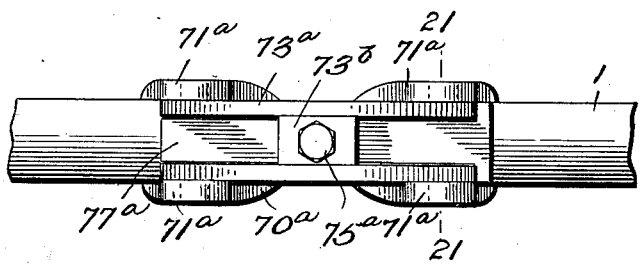
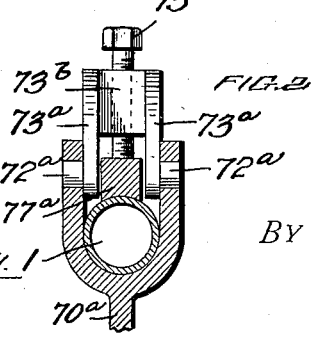

UNITED STATES PATENT OFFICE.

WILLIAM H. COLDWELL AND HARRY T. COLDWELL, OF NEWBURGH, NEW YORK.

LAWN-MOWER.

1,085,585.	Specification of Letters Patent.	Patented Jan. 27, 1914.

Application filed March 15, 1912. Serial No. 684,012.

*To all whom it may concern:*

Be it known that we, WILLIAM H. COLDWELL and HARRY T. COLDWELL, citizens of the United States, residing at Newburgh, in the county of Orange and State of New York, have invented certain new and useful Improvements in Lawn-Mowers; and we do hereby declare the following to be a full, clear, and exact description of the invention, such as will enable others skilled in the art to which it appertains to make and use the same.

Our invention is an improvement in lawn mowers and consists in the novel features hereinafter described reference being had to the accompanying drawings in which we have shown one embodiment of the invention, selected by us for purposes of illustration, and the said invention is fully disclosed in the following description and claims.

Figure 13:
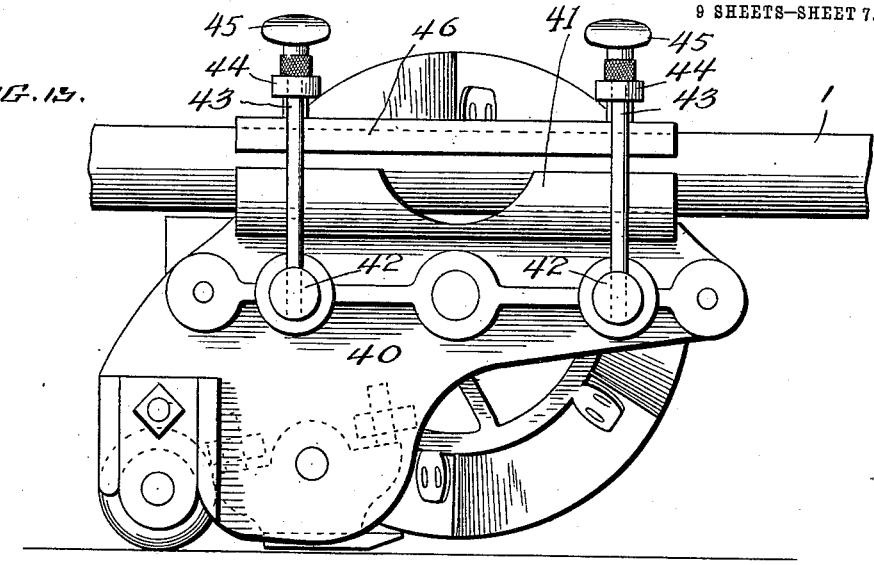
Figure 14:
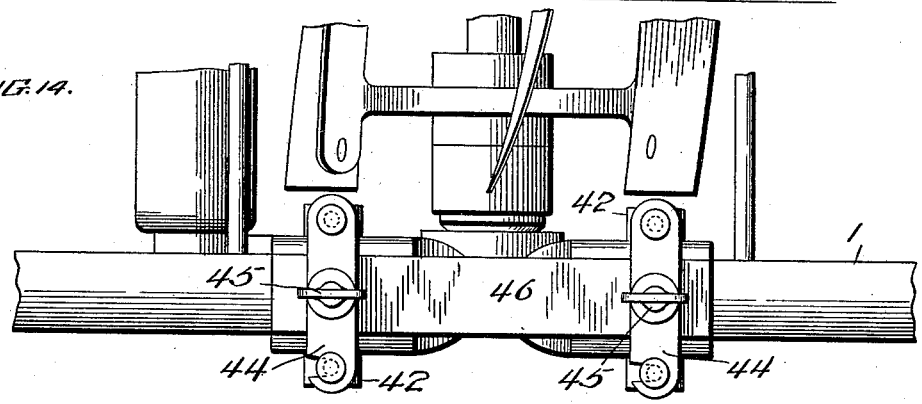
Figure 15:
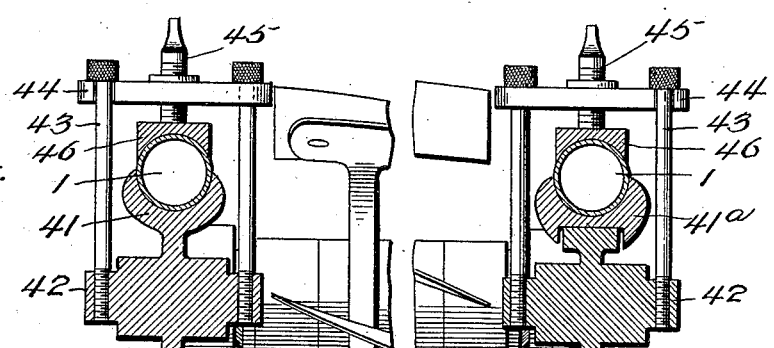
Figure 16:
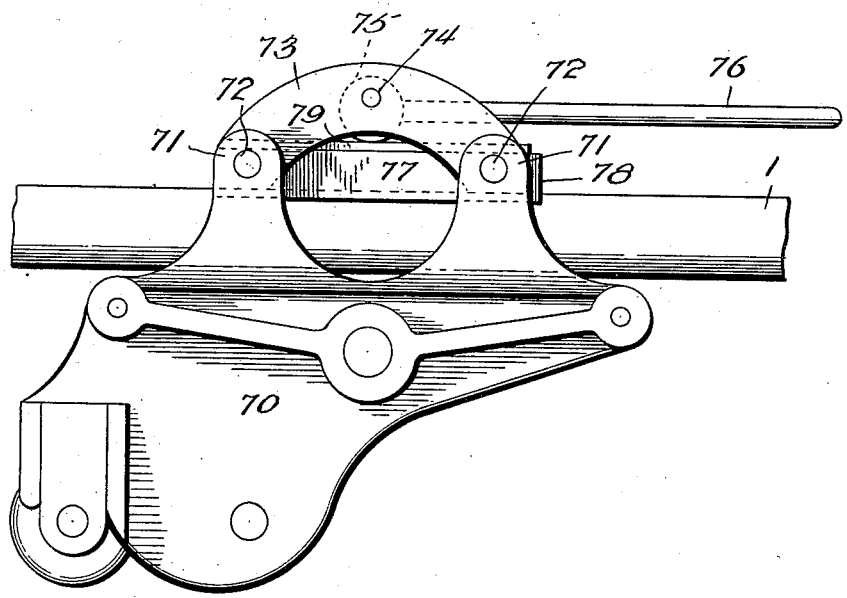
Figure 17:
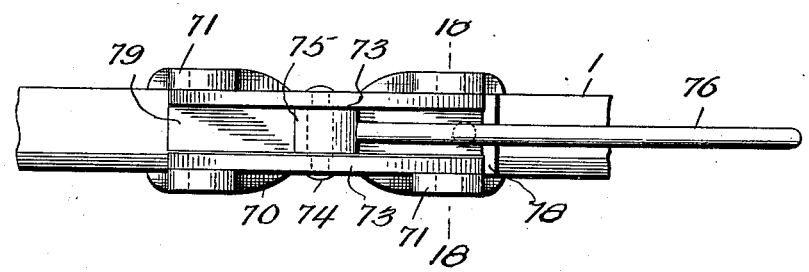
Figure 18:
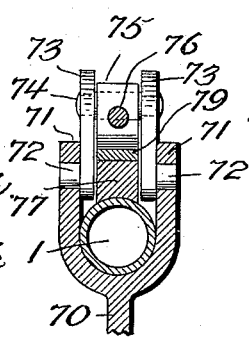

Referring to the said drawings, Figure 1 is a side elevation of an improved lawn mower, the same being an embodiment of our invention selected for the purpose of illustrating the invention. Fig. 2 is a plan view of the machine illustrated in Fig. 1. Fig. 3 is an enlarged longitudinal sectional view of the machine. Fig. 4 is an elevation of the machine, the grass catcher being in folded position, the handle folded down and secured in folded position and the machine turned over in position to be transported from one place to another, the weight of the machine being carried upon the auxiliary wheels. Fig. 5 is a perspective view of the machine with cutter unit detached and grass box removed. Fig 5ª is a view of the cutter unit detached. Fig. 6 is an enlarged side elevation of one of the demountable roller side frames. Fig. 7 is a vertical transverse sectional view on line 7—7 of Fig. 6. Fig. 8 is a top plan view partly in section showing one of the said side frames and one of the auxiliary wheels in position thereon. Fig. 9 is an enlarged side elevation of the caster wheel bracket, showing hook for securing the handle in folded position. Fig. 10 is a top plan of the said bracket. Fig. 11 is a sectional view on line 11—11 of Fig. 10. Fig. 12 is a detail view of the bracket for supporting the intermediate sprocket wheels. Fig. 13 is an enlarged side elevation of the demountable cutter unit, showing our preferred form of means for clamping into the frame. Fig. 14 is a top plan of one side of the same. Fig. 15 is a vertical transverse section of the cutter unit, the central portion being broken away. Fig. 16 is a side elevation of one of the side frames of the cutter unit showing a modification of the means for clamping it to the frame. Fig. 17 is a top plan view of one side of the same. Fig. 18 is a transverse sectional view on line 18—18 of Fig. 17. Fig. 19 is a side elevation of one of the side frames of the cutter unit showing another modification of the means for clamping it to the frame. Fig. 20 is a plan view of one side of the same. Fig. 21 is a vertical transverse section on line 21—21 of Fig. 20.

The object of our invention is to improve the construction of hand propelled lawn mowers, and to provide a machine of this class which is particularly well adapted for use in cutting the grass on the "putting greens" of golf courses, and to provide the machine with a demountable cutter unit to facilitate the removal and replacement of the cutting mechanism, and the making of repairs to the same, and also to provide means for facilitating the transportation of the machine when not in use, from one place to another.

In carrying out our invention we construct the mower frame preferably of steel tubing and provide special devices for connecting the rotary ground engaging devices thereto; we also provide improved means for connecting the demountable cutter unit to the tubular frame; we also provide the frame with a handle also preferably formed of steel tubing pivotally connected to the frame so that it can be folded compactly thereon, and we prefer to provide the frame with auxiliary carrying wheels held out of contact with the ground when the machine is in use, but so arranged that they may be made to support the machine when the latter is not in use, to facilitate transporting it from place to place. We also prefer to provide the machine with a dumping grass box pivotally connected to the frame, the grass box being held in position in the frame, by the handle, when the latter is folded upon the machine.

Our invention also comprises other novel features, all of which are hereinafter more fully pointed out and described in the following description and claims.

The mower frame is formed of light steel tubing, and as we prefer to form it, it comprises the side bars 1, 1, connected by cross bars 2, 3 and 4, the bar 2 being connected to the rear ends of the side bars 1, 1, by suitable elbows and the bars 3 and 4 being connected to the side bars by T's, the parts being brazed together. The side bars are also provided between the cross bars 3 and 4 with projections 5, 5 secured thereto by T's, for determining the position of the demountable cutter unit as hereinafter described. The side bars project forwardly a short distance beyond the cross bar 4 and over these portions are slipped sleeve portions 6 of caster supporting brackets 7, illustrated best in Figs. 9, 10 and 11. Each of said sleeves has a portion 8 open at its inner side, which passes over the cross bar 4, thus preventing the bracket or sleeve from turning. The sleeve is held in position by a bolt 9, passing through bosses on the split or open portions of the sleeve and in rear of the cross bar 4, a block 10 being interposed between the open portions of the sleeve to prevent breaking them. The sleeve 6 is also preferably provided with a handle supporting saddle 6ᵃ and with a boss 11, having a threaded vertical aperture therein in which is screwed the lower end of a retaining hook 12, for engaging the handle in its closed or folded position as hereinafter set forth. The outer end of the bracket 7 is provided with a vertical bearing aperture to receive the stem of the caster wheel 13, and a horizontal recessed portion in which is located a collar 14, adjustably secured on said stem to regulate the height of cut of the cutter unit.

The rear end of the mower frame is provided with a roller 15 preferably made in two separate sections as shown, and mounted on a shaft 16, to which it is connected by means of the usual pawl and ratchet mechanism indicated in Fig. 3, so that the shaft will be rotated only when the roller is moved in a forward direction over the ground. The roller (or rollers) is connected to the frame by means of a pair of roller side frames or brackets each of which comprises the main portion 17 of an elongated oval shape provided with upwardly extended ears 18 at each end, to embrace the tubular frame bar 1. Above the frame bar 1 is a clamp 19 having portions fitting between the ears 18 and adapted to engage the frame bar, and provided on its upper side with a pair of ears 20 to receive the handle. The ears 18 are secured to the clamp 19 by means of bolts 21 having tapered or conical head portions engaging tapered apertures in one of the ears and in the clamp 19 as shown, so that as the nuts on said bolts are drawn up the clamp will be forced down and the main part 17 will be drawn up to clamp the frame bar 1 between them. The forward ear 18 on the inner side of the frame 17 is provided with a lug 22 having a horizontal threaded aperture to receive an adjusting screw 23 extending forwardly and engaging the frame cross bar 3, to regulate and determine the position of the bracket 17 with respect to the frame longitudinally. The bracket 17 is also provided on the inner face of the rear ear 18 with a lug 24 upon which is pivoted the frame of the grass box as hereinafter described, the outer end of said lug being provided with an aperture for a cotter pin. The clamps 19 are also provided each with a saddle 19ᵃ to be engaged by the handle, as shown in Fig. 1, to support it in an inclined position and prevent it from falling to the ground, when in raised position.

The brackets 17, 17 are each provided centrally of their length with a socket 25 to receive the cup of a ball bearing and the shaft 16 is provided at each end with a cone not shown in detail to engage the balls in the cups. One of the brackets 17 is also provided with a set screw 27 for engaging the cup and forcing it inwardly to secure the desired adjustment of the ball bearings. In order to brace the brackets 17, 17 they are preferably connected by transverse brace rods 28, 28 secured to the brackets in any desired manner. The handle of the machine is also preferably formed of steel tubing, as shown, and consists of the two side bars 30, 30 connected at their outer ends by a cross bar 31 which extends beyond the side bars and is provided with knobs which may be conveniently formed of wood. The side bars of the handle are also braced by one or more transverse bars 32, and the inner ends of the side bars are drawn down flat as shown at 33 to fit between the ears 20 of the clamps 19 to which they are connected by pivot bolts 34.

We prefer to provide the machine with a pair of auxiliary wheels 35 and in this instance the pivot bolts 34 are shown as provided with shouldered extensions forming the axles for said wheels. These wheels may be connected to the frame in other ways, however, if desired. The said wheels are so mounted that they are not in contact with the ground when the machine is in operative position, but are used merely for assisting in transporting the machine when not in use. In the use of these machines for mowing the greens on golf courses, for example, the cutter unit will be set very low and a high speed gearing is employed for driving the rotary cutter.

It is quite an annoying problem on golf courses especially to convey the machines rapidly from one green to another, frequently a very considerable distance. In this machine the handle can be folded down upon the saddles 6ᵃ and secured to the main frame by the hooks 12 which can be turned into and out of position to engage the handle. The machine can then be turned over upon the wheels 35 and the attendant by taking hold of the handle can wheel the machine away like a barrow. If the wheels are not desired the shouldered bolt can be replaced by an ordinary bolt for connecting the handle to the frame.

In the forward part of the mower frame is located the demountable cutter unit. In terming this part of the device a cutter unit it is to be understood that the part referred to comprises a fixed and a rotary cutter held in fixed (but adjustable) relation to each other and adapted to be rigidly secured to the mower frame and to be instantly removed therefrom without disturbing the relation of the fixed and rotary cutters and without disturbing any parts except the means for clamping the cutter unit upon the frame, and without necessitating any adjustment of the parts when the cutter unit is applied to the frame. The cutter unit herein shown comprises two side brackets 40 each provided at its upper edge with grooved portions 41 to engage the lower face of the frame bar 1.

In order to accommodate slight variations in the width of different frames, which may occur in manufacturing them, we prefer to make the bar engaging portion of one of the brackets separate as shown at 41$^a$, and to provide it on its lower side with a longitudinal groove fitting over the upper edge of the bracket, the said groove being slightly wider than the edge portion over which it fits. Between the brackets 40 is secured the stationary knife bar, carrying the stationary knife or cutter, the said knife bar being pivotally mounted in the brackets and capable of adjustment to regulate the distance between the knife blade carried thereby and the blades of the rotary cutter. In the present case the brackets are provided with lugs on their inner faces having threaded apertures therein to receive adjusting set screws which engage the knife bar at points on opposite sides of its pivotal connection, so that by loosening one screw and tightening the other, the knife bar is adjusted, in the manner shown and described in the U. S. Patent to W. H. Coldwell No. 817,157. The brackets 40 are also provided with suitable bearings, preferably ball bearings, for the shaft of the rotary cutter, and in order to protect the cutters the said brackets are also preferably provided with a guard roller of usual construction, as shown.

In the preferred form of cutter unit shown in Figs. 13, 14 and 15, the brackets 40 are each provided on each side with a pair of lugs 42 having vertical threaded apertures in which are inserted the clamping screws 43, one screw of each pair carrying a clamping plate 44 pivotally connected therewith, the other end of said plate being provided with a notch to engage the other screw of the pair beneath the head thereof. Each of the clamps carries a clamping screw 45, threaded in an opening in the clamp and adapted to engage a clamping block 46, having its lower face concaved to fit upon the top of one of the side bars of the mower frame, thus clamping the cutter unit firmly and rigidly to the frame. Each of the side brackets is provided with a rearwardly extending set screw 47 which engages a fixed part of the mower frame, in this instance, the projections 5, 5, and by properly adjusting these screws the position of the cutter unit with respect to the mower frame is determined. To remove the cutter unit, it is only necessary to loosen the screws 45 and swing the clamps laterally, the entire cutter unit coming away from the mower frame without disturbing the adjustment of the fixed and rotary cutters. The cutter unit can be replaced in exactly the same position it previously occupied and again secured in position or another cutter unit may be secured in position in the frame.

In order to drive the rotary cutter, we provide the shaft 16 of the roller, with a driving sprocket 50 and connect said sprocket preferably with a small intermediate sprocket 51 to which is attached a large intermediate sprocket 52 which is connected by chain with a sprocket 53 on the shaft of the rotary cutter as shown in Fig. 2. The intermediate sprockets are conveniently mounted on a bracket 54 having clamping portions 55 for engaging the adjacent frame bar 1 as shown best in Fig. 12.

We do not limit ourselves to the particular gearing or type of gearing herein shown and we may use bevel gearing or a gear train. It will be noted that when the cutter unit is disengaged from the frame the sprocket wheel 53 can be instantly disengaged from the sprocket chain, and it will also be noted that if the cutter shaft were provided with a bevel or other pinion it could be just as easily moved into and out of engagement with the adjacent pinion, where gearing is employed instead of chains and sprocket wheels. We also prefer to provide the mower with a grass box or grass catcher for collecting the cut grass as it is cut by the rotary cutter. In the embodiment of our invention herein illustrated and described the grass box is illustrated as being composed of a metallic body having a flexible or folding upper portion of canvas, the whole being pivotally connected with the frame of the mower. As shown herein 56, 56 represent a pair of side bars pivotally connected to the mower frame, in this instance by having their rear ends provided with holes fitting over the studs or lugs 24, 24 of the roller brackets, upon which said arms are secured by passing a cotter pin through an aperture in the outer end of each of said lugs. These arms extend forward and are provided near their forward ends with means for supporting them, in this instance with lugs 57 (see Fig. 1) which rest upon the frame bars 1, and said arms are secured to the main body 58 of the grass box, which is thus supported between the side bars 1. The front edge of the bottom of the box is preferably curved upwardly to overlie the guard roller, as indicated at 59, said edge terminating adjacent to the stationary knife bar. The side walls of the box 58 are provided with extension walls 60 of flexible material, preferably canvas, and the upper edge of the back wall of the box is provided with a metal discharge plate 61 pivotally connected thereto, said plate being secured to the rear edges of the canvas side portions.

62, 62 represent pivoted braces pivoted to the metal sides of the box body and extending forwardly and connected to the front edge of the canvas side portions. It will be seen that the weight of the discharge plate 61 holds the flexible upper portion of the box, which extends considerably above the mower frame, in operative position. If, however, the metal discharge plate is folded forwardly over the box body the flexible side extensions will collapse and the braces 62 will be allowed to drop to the horizontal plane of the side bars 56, thus folding the upper part of the grass box. When the grass box is so folded the handle may be folded into horizontal position and secured by the hooks 12 as before described and the machine can be turned over and trundled to any place desired, on the wheels 35, the handle serving to hold the grass box in position when the machine is turned over.

When the grass box is in operative position as shown in Fig. 1 it may be dumped by raising the forward end, the box swinging on the pivotal connection of the arms 56 at the rear ends thereof and the cut grass being discharged over the plate 61 in rear of the roller.

In Figs. 16, 17 and 18 we have shown a slightly modified construction for securing the demountable cutter unit to the mower frame. In these figures 70 represents the side brackets of the cutter unit constructed similarly to the brackets 40 previously described, except that they are preferably provided with upwardly extending ears 71, 71 arranged in pairs on opposite sides of the frame bars 1, 1 adjacent to the portions of the brackets which fit against the under faces of the frame bars 1. These ears are perforated to receive lateral studs 72 on a pair of plates 73 provided for each bracket, said plates being arched and connected by a pivot bolt or rivet 74 upon which is rotatably mounted an eccentric 75 provided with an operating handle or lever 76.

77 represents a block adapted to be placed in engagement with the top of the frame bar above the bracket between the arched plates, thus holding their studs in engagement with the holes in the ears 71, the block being provided preferably with a laterally extended head 78 to prevent it being pushed clear through between said plates, and said block is also provided on its upper face with a flat spring 79, which is preferably riveted to the block to prevent it from getting lost or misplaced. The pivot 74 is sufficiently loose in its engagement with the arched plates 73 to permit said plates to be drawn together to facilitate inserting and removing the studs 72 from said ears. When they are so engaged with said ears, and the block with its spring (77—79) is placed in position, the eccentric 75 is turned by means of the handle 76, so as to press downwardly upon the spring and block and thus firmly clamp the cutter unit to the side bar of the mower frame. The handle 76 will preferably be so applied to the eccentric that it will lie in a horizontal position when the parts are in locked position. By raising the handle 76 the eccentric will release the block which can be removed together with the arched plates thus freeing the cutter unit from the machine.

Figs. 19, 20 and 21 illustrate another form of clamping device for securing the demountable cutter unit to the mower frame. In the construction illustrated in these figures 70$^a$ represents the side brackets of the cutter unit, which are constructed identically like the brackets 70 just previously described except that the ears 71$^a$ are provided with horizontal slots 71$^b$, thus forming hooks. The arched plates 73$^a$ are connected centrally by a block 73$^b$, and have their ends provided with outwardly extending lugs or studs 72$^a$. With this construction we employ a block 77$^a$, which may be used without a flat spring, and said block is clamped in position by a set screw 75$^a$ passing through a threaded aperture in the spacing block 73$^b$ as shown. With this construction the cutter unit is secured in position or released by a partial turn of the two set screws 75$^a$ as will be readily understood, which will enable the blocks 77$^a$ to be drawn out.

It should also be noted that when the machine is turned over upon the auxiliary supporting wheels 35, 35 as shown in Fig. 3, the axis of the drive roller is located on the side of the axis of rotation of said wheels opposite the other portions of the frame as indicated by the dotted perpendicular lines in Fig. 4, whereby the weight of the drive roller tends to counterbalance the weight of the other portions of the machine, and relieve the hands of the operator substantially of the weight of any material portion of the machine, thus making it very easy to push or draw the machine from place to place, as the weight is substantially supported by the auxiliary wheels.

What we claim and desire to secure by Letters Patent is:—

1. In a lawn mower, the combination with a horizontally disposed frame, composed of longitudinally disposed tubular bars and transversely disposed tubular bars connecting the longitudinal bars, supports for rotary ground engaging devices having concave portions fitting portions of said bars, means for securing said supports rigidly to said bars, rotary ground engaging devices mounted in said supports, cutting mechanism provided with supporting devices having concave portions for engaging said longitudinal bars, means for securing said supporting devices to the said bars, caster wheels for supporting the frame located forward of said cutting mechanism, devices for attaching said caster wheels having portions fitting portions of the tubular frame bars, and means for operating said cutting mechanism.

2. In a lawn mower, the combination with a horizontally disposed frame composed of longitudinally disposed tubular bars and transversely disposed tubular bars connecting the longitudinal bars, supports for rotary ground engaging devices having concave portions fitting portions of said bars, means for securing said supports rigidly to said bars, rotary ground engaging devices mounted in said supports, cutting mechanism provided with supporting devices having concave portions for engaging said longitudinal bars, means for securing said supporting devices to the said bars, caster wheels for supporting the frame located forward of said cutting mechanism, devices for attaching said caster wheels having portions fitting portions of the tubular frame bars, a handle composed of longitudinally and transversely disposed tubular bars, the longitudinal handle bars being operatively connected with the longitudinal frame bars by pivotal connections.

3. In a lawn mower, the combination with a horizontally disposed frame, composed of longitudinally disposed tubular bars and transversely disposed tubular bars connecting the longitudinal bars, supports for rotary ground engaging devices having concave portions fitting portions of said bars, means for securing said supports rigidly to said bars, rotary ground engaging devices mounted in said supports, cutting mechanism provided with supporting devices having concave portions for engaging said longitudinal bars, means for securing said supporting devices to the said bars, caster wheels for supporting the frame located forward of said cutting mechanism, devices for attaching said caster wheels having portions fitting portions of the tubular frame bars, a handle composed of longitudinally and transversely disposed tubular bars, pivotally connected to the supports for said rotary ground engaging devices and constructed to fold down into a substantially horizontal position upon the horizontally disposed frame, and means for operating the cutting mechanism.

4. In a lawn mower, the combination with a horizontally disposed frame, composed of longitudinally disposed tubular bars and transversely disposed tubular bars connecting the longitudinal bars, supports for rotary ground engaging devices having concave portions fitting portions of said bars, means for securing said supports rigidly to said bars, rotary ground engaging devices mounted in said supports, cutting mechanism provided with supporting devices having concave portions for engaging said longitudinal bars, means for securing said supporting devices to the said bars, caster wheels for supporting the frame located forward of said cutting mechanism, devices for attaching said caster wheels having portions fitting portions of the tubular frame bars, a handle composed of longitudinally and transversely disposed tubular bars, pivotally connected to the supports for said rotary ground engaging devices, and constructed to fold down into a substantially horizontal position upon the horizontally disposed frame, devices carried by said supports for sustaining the handle in operative position, and devices carried by the frame near its forward end for supporting the handle in folded position, and means for actuating the cutting mechanism.

5. In a lawn mower, the combination with a horizontally disposed frame, composed of longitudinally disposed tubular bars and transversely disposed tubular bars connecting the longitudinal bars, supports for rotary ground engaging devices having concave portions fitting portions of said bars, means for securing said supports rigidly to said bars, rotary ground engaging devices mounted in said supports, cutting mechanism provided with supporting devices having concave portions for engaging said longitudinal bars, means for securing said supporting devices to the said bars, caster wheels for supporting the frame located forward of said cutting mechanism, devices for attaching said caster wheels having portions fitting portions of the tubular frame bars, a handle composed of longitudinally and transversely disposed tubular bars, pivotally connected to the supports for said rotary ground engaging devices, and constructed to fold down into a substantially horizontal position upon the horizontally disposed frame, devices carried by said frame near its forward end for supporting the handle in folded position, means for locking the handle in folded position upon said supporting devices, and means for actuating the cutting mechanism.

6. The combination with a lawn mower provided with main rotary ground engaging devices for supporting the same, cutting mechanism and operating means therefor, of auxiliary rotary devices having their axes in fixed relation with the mower frame, and having their peripheral portions held out of contact with the ground, when the mower is in operative position, and extending above the upper portions of the mower and the main rotary ground engaging devices thereof, whereby said mower may be inverted and supported upon said auxiliary rotary devices.

7. The combination with a lawn mower provided with main rotary ground engaging devices for supporting the same, cutting mechanism and operating means therefor, of auxiliary rotary devices having their axes in fixed relation with the mower frame, and parallel with the axes of the main rotary ground engaging devices, and having their peripheral portions normally held out of contact with the ground when the mower is in operative position, and extending above the upper portions of the mower and the main rotary ground engaging devices thereof whereby the mower may be inverted and supported upon said auxiliary rotary devices.

8. The combination with a hand propelled lawn mower provided with a handle pivotally connected thereto, and constructed to fold down into a substantially horizontal position upon the mower, of auxiliary rotary devices, having their peripheral portions normally out of engagement with the ground, and their axes parallel with the axes of the rotary supporting and traction devices of the mower, whereby the mower may be inverted and supported upon said auxiliary rotary devices and the handle.

9. The combination with a hand propelled lawn mower, provided with a handle pivotally connected thereto, and constructed to fold down into a substantially horizontal position upon the mower, of auxiliary rotary devices having their peripheral portions normally out of engagement with the ground, and their axes parallel with the axes of the rotary supporting and traction devices of the mower, and means for locking the handle in its folded position, whereby the said frame may be inverted and supported by said handle and the said auxiliary rotary devices.

10. In a lawn mower provided with a horizontally disposed frame, rotary supporting devices therefor, and cutting mechanism, the combination of a grass box supported entirely by said frame and located between its front and rear ends, adjacent to the cutting mechanism, said grass box being pivotally connected with the frame, and movable vertically with respect thereto to facilitate dumping, and a handle pivoted to the mower frame adjacent to one end of the frame by connections permitting it to be folded down into a horizontal position upon the mower frame and grass-box, when not in use, thereby holding the grass box from vertical movement.

11. In a lawn mower provided with a horizontally disposed frame provided with rotary supporting devices and cutting mechanism, the combination of a grass box pivotally connected with said frame and movable vertically with respect thereto, to facilitate dumping, a handle pivoted to the mower frame adjacent to one end of said frame by connections permitting it to be folded down upon the mower frame when not in use and thereby hold the grass box from vertical movement, and means for securing the handle to the frame at a distance from its pivotal connections to lock it in folded position.

12. In a lawn mower, the combination with a horizontally disposed frame provided with rotary supporting devices and cutting mechanism, of auxiliary supporting wheels for the frame normally held out of operative contact with the ground, a grass box pivotally supported in said frame, a handle pivotally connected with said frame and constructed to fold down into a substantially horizontal position upon the grass box, to hold the latter in position in the frame when the latter is inverted, the said auxiliary wheels having their peripheral portions extending above the plane of the brass box and handle when the latter is in folded position, whereby the frame may be turned over to bring said auxiliary wheels into contact with the ground.

13. In a lawn mower, the combination with the cutter carrying frame thereof, of a demountable cutter unit, comprising a rotary cutter, a stationary knife, and means for supporting said cutter and knife in operative relation, said cutter unit being provided with adjustable positioning devices, for determining the position of the cutter unit in said frame, devices for securing said cutter unit in the cutter carrying frame, said frame being provided with fixed positioning devices, coöperating with and adapted to be engaged by the positioning devices of the cutter unit.

14. In a lawn mower, the combination with the cutter carrying frame provided with horizontally disposed tubular bars, and positioning devices for a cutter unit located on said bars, of a demountable cutter unit comprising the side plates provided with portions fitting said tubular bars, transversely disposed devices connecting said side plates, a stationary knife, a rotary cutter mounted in said side plates, and devices for holding the rotary cutter and stationary knife in operative relation to each other, and adjustable positioning devices carried by said side plates for engaging the positioning devices on said frame bars, and readily detachable means for rigidly connecting the cutter unit to the said frame bars.

15. In a lawn mower, the combination with the cutter carrying frame, provided with horizontally disposed bars, and rotary ground engaging supporting devices, of a demountable cutter unit comprising side plates having portions constructed to fit said frame bars, a rotary cutter and a stationary knife carried by said side plates, and means for holding the said cutter and knife in operative relation with each other, clamping blocks constructed to engage frame bars opposite the bar engaging portions of said side plates and readily detachable devices for forcing said bar engaging portions and clamping blocks toward each other to clamp the said bars between them.

16. In a lawn mower, the combination with the cutter carrying frame, provided with horizontally disposed bars, and rotary ground engaging supporting devices, of a demountable cutter unit comprising side plates, having portions constructed to fit said frame bars, a rotary cutter and a stationary knife carried by said side plates, and means for holding the said cutter and knife in operative relation with each other, clamping blocks constructed to engage frame bars opposite the bar engaging portions of said side plates, devices connected with said side plates of the cutter unit and extending on the opposite side of said clamping blocks and clamping devices carried thereby for engaging said clamping blocks.

17. In a lawn mower, the combination with the cutter carrying frame, provided with horizontally disposed bars, and rotary ground engaging supporting devices, of a demountable cutter unit comprising side plates, having portions constructed to fit said frame bars, a rotary cutter and a stationary knife carried by said side plates, and means for holding the said cutter and knife in operative relation with each other, clamping blocks constructed to engage frame bars opposite the bar engaging portions of said side plates, clamping plates operatively connected with said side plates, and located above the clamping blocks, and clamping devices carried by said clamping plates for engaging said clamping blocks.

18. In a lawn mower, the combination with the cutter carrying frame, provided with horizontally disposed bars, and rotary ground engaging supporting devices, of a demountable cutter unit comprising side plates having portions constructed to fit said frame bars, a rotary cutter and a stationary knife carried by said side plates, and means for holding the said cutter and knife in operative relation with each other, clamping blocks constructed to engage frame bars opposite the bar engaging portions of said side plates, connecting devices secured to said side plates on opposite sides of the frame bars, clamping plates pivotally connected with said connecting devices on one side of each frame bar and provided with means for detachably engaging the connecting devices on the opposite sides of the frame bars, and clamping screws carried by said clamping plates for engaging the said clamping blocks.

19. In a lawn mower, the combination with a horizontally disposed frame composed of bars, and provided at its forward end with caster wheels, of a lawn rolling roller, supporting side frames therefor, having portions for engaging the frame bars, detachable means for securing said side frames to the bars of the mower frame, and cutting mechanism carried by the mower frame, and devices interposed between said roller supporting side frames and portions of said mower frame for fixing the relative positions of said parts independently of said securing devices.

20. In a lawn mower, the combination with a horizontally disposed frame composed of bars, and provided at its forward end with caster wheels, of a lawn rolling roller, supporting side frames therefor, having portions for engaging the frame bars, detachable means for securing said side frames to the bars of the mower frame, and cutting mechanism carried by the mower frame, devices carried by said roller side frames for engaging portions of the mower frame when the parts are assembled, to determine the relative positions of the side frames, and the mower frame independently of said securing means.

21. In a lawn mower, the combination with a horizontally disposed frame composed of bars, and provided at its forward end with caster wheels, of a lawn rolling roller, supporting side frames therefor, having portions for engaging the frame bars, detachable means for securing said side frames to the bars of the mower frame, and cutting mechanism carried by the mower frame, and positioning devices adjustably secured to said roller side frames for engaging parts of the mower frame when the parts are assembled for fixing the relative positions of the said side frames and the mower frame independently of said securing means.

22. In a lawn mower, the combination with a horizontally disposed frame provided at its forward end with caster wheels, of a lawn rolling roller, supporting side frames therefor having portions for engaging the frame bars, adjustable positioning devices carried by the said side frames for engaging parts of the mower frame for positioning the said side frames and roller with respect to the mower frame, and detachable clamping devices for securing the said side frames to the mower frame.

23. In a lawn mower having its frame provided with main rotary ground engaging devices and carrying cutting mechanism, a pair of auxiliary wheels secured to the frame, and having their peripheral portions out of contact with the ground and extending above the upper portions of the frame and the main rotary ground engaging devices, and having their axes disposed in a line transversely of the frame, said axes being so located longitudinally of the frame that when the mower is inverted the greater part of its weight will be supported by said auxiliary wheels.

24. The combination with a lawn mower provided with a main frame, a drive roller located adjacent to one end of said frame, ground engaging supporting devices adjacent to the other end of the frame, and cutting mechanism carried by said frame, of a pair of auxiliary supporting wheels, normally held out of engagement with the ground when the mower is in operative position, and having the axis of rotation thereof so disposed with respect to the axis of the drive roller, that when the machine is inverted to bring said auxiliary wheels into engagement with the ground the weight of said roller will tend to counterbalance the weight of the portion of the machine on the other side of the axis of rotation of said auxiliary wheels.

In testimony whereof we affix our signatures, in the presence of two witnesses.

WILLIAM H. COLDWELL.
HARRY T. COLDWELL.

Witnesses:
W. H. CHADWICK,
N. W. MURTFELDT.

---

Copies of this patent may be obtained for five cents each, by addressing the "Commissioner of Patents, Washington, D. C."